United States Patent [19]

Baum et al.

[11] 4,415,196

[45] Nov. 15, 1983

[54] GLASS WITH CONDUCTIVE STRIPS FOR SUPPLYING WINDSHIELD WIPER

[75] Inventors: Hans Baum; Egbert Balling, both of Cologne, Fed. Rep. of Germany

[73] Assignee: Saint-Gobain Vitrage, France

[21] Appl. No.: 229,831

[22] Filed: Jan. 30, 1981

[30] Foreign Application Priority Data

Feb. 7, 1980 [DE] Fed. Rep. of Germany ....... 3004457

[51] Int. Cl.³ .............................................. B60J 1/20
[52] U.S. Cl. .................................. 296/201; 296/84 R; 219/203; 219/522; 49/70; 15/250.3
[58] Field of Search .......... 340/550; 296/84 R, 84 A, 296/85, 86, 89, 90, 146, 37.16, 76, 56; 338/308, 309; 219/522, 203, 547; 15/250 A, 250.05, 250 C; 307/9; 40/541, 466, 470, 588, 591, 592; 49/394, 449, 70

[56] References Cited

U.S. PATENT DOCUMENTS

| 2,168,533 | 8/1939 | Nickola | 296/84 |
|---|---|---|---|
| 3,336,612 | 8/1967 | Stevans | 9/1 |
| 3,532,858 | 10/1970 | Peetz | 219/522 |
| 3,553,833 | 1/1971 | Jochim et al. | 29/611 |
| 3,813,519 | 5/1974 | Jochim et al. | 219/522 |
| 3,993,346 | 11/1976 | Mounts | 296/84 N |
| 3,998,009 | 12/1976 | Niessner | 49/394 |
| 4,132,881 | 1/1979 | Ciarniello | 219/203 |

Primary Examiner—Robert R. Song
Assistant Examiner—Dennis Pedder
Attorney, Agent, or Firm—Pennie & Edmonds

[57] ABSTRACT

A window formed by a glass pane for use as a window for a vehicle. The window is supported by structure carried by the body of the vehicle to move about an axis thereby to swivel between positions of opened and closed. The window supports an electric consumer and electrical conducting strips are carried by the window for use in connecting the electric consumer to a source of power supplied by the vehicle.

11 Claims, 4 Drawing Figures

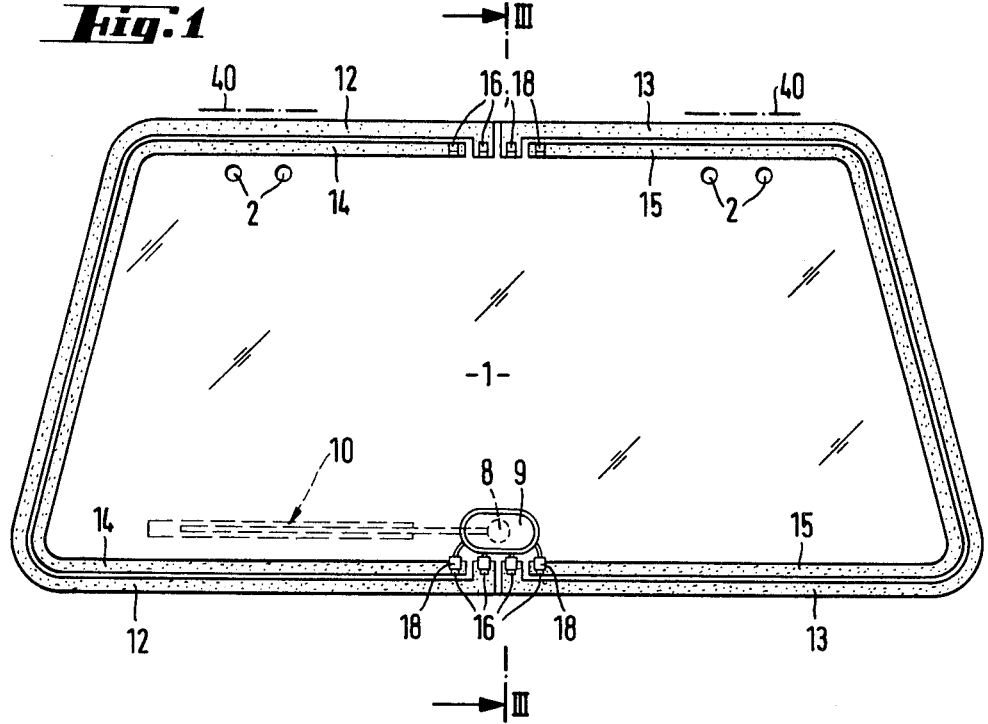
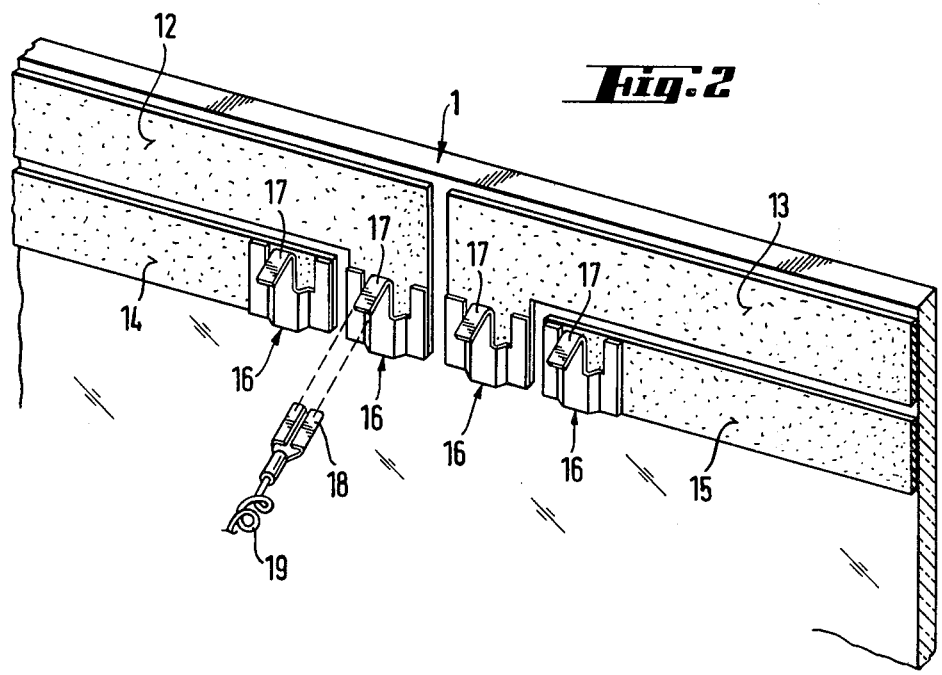

U.S. Patent  Nov. 15, 1983  Sheet 2 of 2  4,415,196
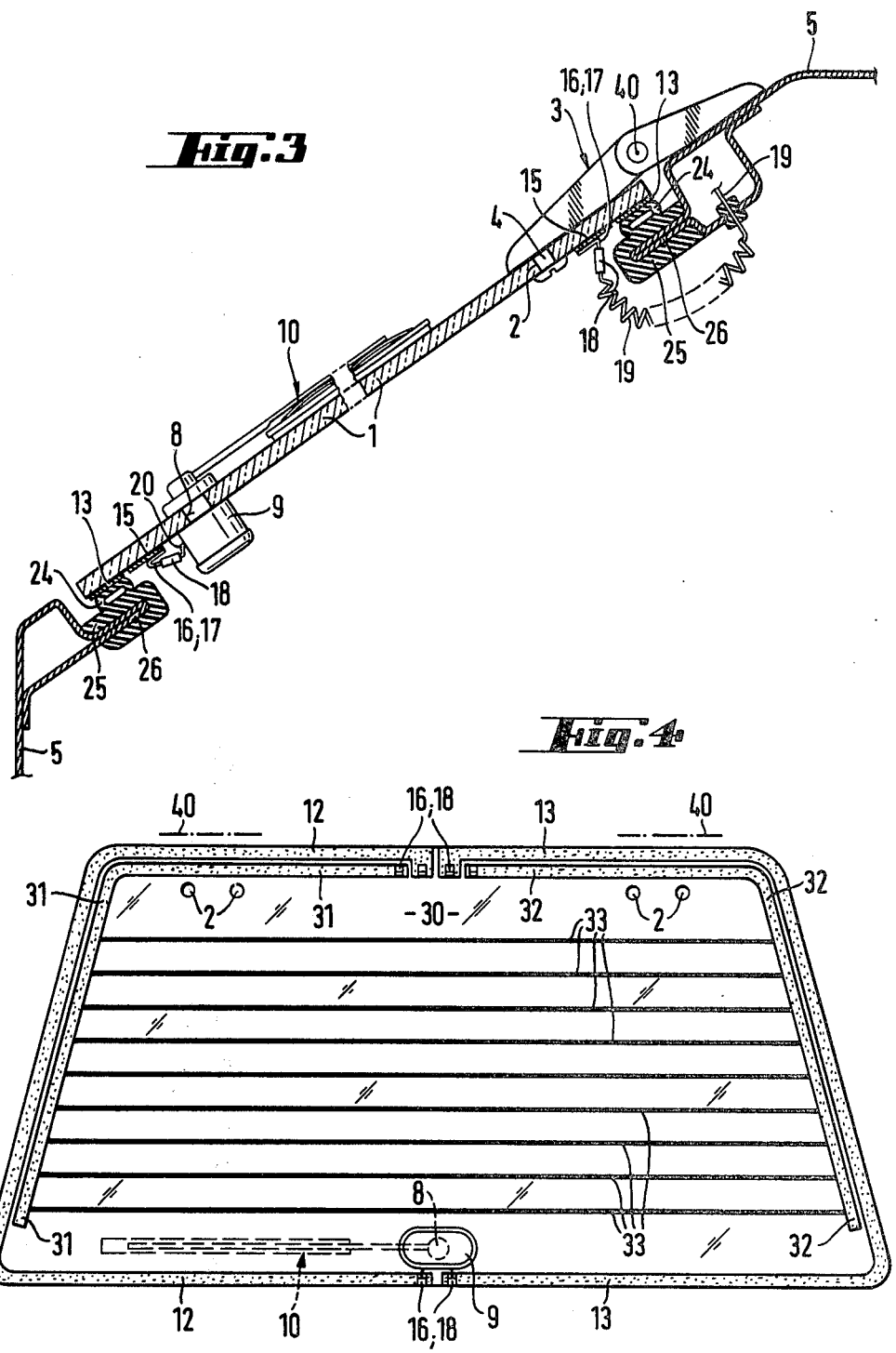

GLASS WITH CONDUCTIVE STRIPS FOR SUPPLYING WINDSHIELD WIPER

DESCRIPTION

Technical Field

The invention relates to a glass pane for use as a vehicle window. The glass pane supports an electric consumer which may be a windshield wiper and the glass pane is mounted in a fashion whereby the vehicle window is capable of swiveling or tilting about an axis.

Background Art

Glass panes for use as a window for a vehicle having capability of swiveling or tilting about an axis are known in the prior art. By and large, in this adaptation, the windows are used as a rear window, but in special cases, for example, in agricultural, utility and like vehicles, the window may be used as a front window or windshield. It is known that the windows are supported by a metal frame; and one or more hinges, usually located at the upper edge of the window, are provided for purposes both of securing the window to the body of the vehicle and providing the axis about which the window may tilt. In this case, one portion of the hinge is attached to the body of the vehicle and the other portion of the hinge normally is attached to the metal frame which supports the window.

It is also known, that windows having the aforementioned capability may be of the frameless variety whereby the hinge or hinges securing the window, again, will have one portion attached to the body of the vehicle and the other portion attached directly on the glass pane. To this end, securement as a rule requires that one or more bores be formed or provided in the glass pane for receipt of a mounting instumentality, such as a screw.

Glass panes to be used as a front window or windshield even if capable of tilting normally will be equipped with a windshield wiper. Rear windows of this type are being equipped with wipers in an increasing number of instances as well. If the window is supported by a metal frame, the motor of the wiper typically is mounted on the frame. If the window is of the frameless variety, the motor of the wiper will be mounted on the glass pane.

Problems and disadvantages in the supply of power from the source of power provided by the vehicle to an electric consumer, such as the motor of a wiper or, for example, a light which may be a probing search light similarly located, have developed with windows capable of tilting about an axis. In the prior art, a power cable has been used in the direct supply of power from the source of power to the electric consumer. It is also known that a power connection between the source of power and the window may be established by a pair of contacts, one of which is disposed on the window within the region of the lower edge, opposite the axis about which the window tilts, with the other contact in direct connection with the source of power being disposed on the body of the vehicle. Thus, electrical connection between the contacts is established when the window is in the closed position.

Referring to the use of a power cable to establish an electrical connection, and particularly the adaptation of a window supported by a frame, the power cable normally is placed within the metal frame. In the adaptation of window of the frameless variety, normally the power cable is disposed around the edge of the window. A member, then, is used to support the power cable in that disposition. Typically, the member will have a U-shaped profile whose legs which extend from a base are received over opposite surfaces of the window. The power cable, therefore, will be confined within the region of the base.

The problems and disadvantages reside principally in the fact that it is necessary to use additional separate cables from the edge of the window to the location of the electric consumer. This necessity results in additional expense, both in labor and material. A further problem and disadvantage, referring to the type of electrical connection wherein a power connection is established by a pair of contacts, resides in the fact that the electric consumer functions only when the window is closed.

It is an object and an important aspect of the invention to overcome the problems and disadvantages heretofore noted in the supply of power from a source of power to an electric consumer supported on a glass pane which functions as a window of a vehicle, and which window is capable of tilting about an axis. According to the invention, the electric consumer will be supplied power through use of a circuit requiring only a small amount of space and one which requires minimal use of separate cables. The circuit, thus, will reduce expenses of labor and material and it will result in a more aesthetic system.

DISCLOSURE OF THE INVENTION

The glass pane of the invention for use as a vehicle window, capable both of supporting an electric consumer and swiveling about an axis, provides an improvement over the prior art particularly in the manner of supplying power from a source of power to the electric consumer. To this end, current feed lines for the electric consumer in the form of conducting strips are printed on the inner surface of the window along the edge. The window system is connected to the source of power supplied by the vehicle by connecting elements located on the connecting strips. The connecting elements preferably are located on the conducting strips within an area of termination adjacent to the axis about which the window may tilt.

The invention accordingly, overcomes the problems and disadvantages heretofore discussed in connection with prior art vehicle windows of the type capable of tilting or swiveling about an axis. Particularly, the invention overcomes the disadvantages incident to the prior art circuit connections provided by a pair of contacts. In addition, the invention overcomes the disadvantages incident to prior art teachings wherein the circuit connection is completed by separate power cables supported in the area of the glass pane by metal framing or the members having the U-shaped profile as heretofore mentioned.

The invention provides for considerable simplification in the supply of power from a source of power to an electric consumer. Additional advantages of the invention will become clear to to those skilled in the art as the description continues.

BRIEF DESCRIPTION OF THE DRAWING

FIG. 1 illustrates in elevation a glass pane for use as a vehicle window;

FIG. 2 is a partial perspective and enlarged view of the glass pane of FIG. 1;

FIG. 3 is a view as seen along the line III—III of FIG. 1, also slightly enlarged, and further illustrating the manner of mounting the glass pane to the vehicle; and FIG. 4 is a view similar to FIG. 1 yet illustrating a further embodiment of the invention.

BEST MODE FOR CARRYING OUT THE INVENTION

The glass pane 1 of the invention, see FIG. 1, is particularly adapted for use as a window, either a front (windshield) or rear window, of a vehicle. In FIG. 3, to which further reference will be made, the vehicle is illustrated partially by the portion of the body 5 surrounding an opening to the interior which is closed by the window.

The glass pane (hereafter "window") preferably is formed of single-pane safety glass which may be prestressed silicate glass. The window, also, may be of the frameless variety, that is, without a metal frame, as illustrated in the Figures. However, in the adaptation wherein the window is capable of tilting or swiveling about an axis, the window may be provided in an individual case with a form of enclosure (not shown) characterized by a member of U-shaped profile located along the edge of the window. The enclosure may be formed of metal, it may be formed of plastic, and if the enclosure shall have functioned as an instrumentality for packing the window the enclosure, also, may be formed of rubber or one of the known rubber substitutes.

The window 1 is mounted thereby to be capable of tilting or swiveling about an axis. A pair of hinges 3 are provided for mounting the window in this fashion. Each hinge includes a pair of arms extending in opposite directions from a pin 40 which defines the axis about which the window moves. As illustrated in FIG. 3, one arm extends over the surface of window 1 and the other arm extends over the surface of body 5. A hole 2 (see also FIG. 1) and preferably a pair of holes in side-by-side relation extend through the window on opposite sides of a center line. The holes are generally centered in each section. A screw 4 is received through each hole 2 to intercooperate with the respective arm of each hinge. The length of the arm of the hinge which extends over the window and the location of the individual holes relative to the upper edge of the window are chosen such that the axis about which the window moves will be located in a close, spaced relation to that edge.

The other arm of each hinge 3 will be mounted to body 5 in a similar manner.

A hole 8 (see FIGS. 1, 3 and 4) extends through the window within the region of the lower edge. It is also contemplated that a pair of holes 8 may extend through the window within the region of the lower edge, as well. Each hole is provided for purposes of mounting an electric consumer. It is contemplated that the electric consumer may be a motor 9, such as a motor for a windshield wiper. It is contemplated, also, that one or a pair of motors may be mounted to the window. In the former case, as illustrated, a single hole will be formed in the window, preferably in a position of symmetry relative to the sections of the window. In the latter case, for example, if a pair of wipers and wiper motors are required the holes will be formed in the window preferably in a position of symmetry within each section. A single wiper and wiper motor may be used with a rear window, while a pair of wipers and wiper motors may be used with a front window or windshield.

In either case, the motor is seated on the inside of the window in position over hole 8 so that the output shaft of the motor extends through the hole. The surface at the base of the motor seated on the inside of the window may be considered a mounting base. An arm 10 carrying a wiper blade is attached in any conventional manner to the output shaft. The motor 9 is attached to window 1, likewise in any conventional manner.

An important aspect of the invention concerns the manner of supply of power from the source of power to the motor(s) 9. Referring to FIGS. 1-3, a plurality of conducting strips are carried by window 1. To this end, conducting strips 12, 13, 14 and 15 are carried by the window along the edges, with each strip extending from the region of the center line at the lower edge to the region of the center line at the top edge of the window. In the form of invention of FIGS. 1-3, the conducting strips 12 and 14 are located in parallel paths, and the conducting strips 13 and 15 are similarly located. This plurality of four strips may be provided for automatic ON-OFF control of the motor 9.

The conducting strips are printed on and burnt into the surface of the glass pane. The printing process may be carried out by a screen printing process and the conducting strips so deposited may be burnt in or melted onto the surface of the glass pane in the course of a bending and/or prestressing process. These processes are known to the prior art.

The conducting strips are comprised of an enamel which includes metallic silver particles in sufficient amount to assure electrical conductivity thereby to supply power to the motor 9. These silver-enamels, also, are known in the art of manufacture of electrically heated glass panes.

It is contemplated according to the invention to reinforce the conducting strip and in some instances to increase the conductivity of the conducting strips. Reinforcement of each conducting strip, as well as increasing its conductivity, may be achieved by a galvanic copper deposit. It is also contemplated to use, in addition, a nickel and/or chromium deposit.

According to the invention, the conducting strips 12 and 14, and the conducting strips 13 and 15, are spaced apart through a distance of about 1 to about 3 mm. Each conducting strip is of a width of about 1 to about 2 cm and each conducting strip has a thickness of about 10 to about 100 $\mu$m. In a preferred embodiment, the thickness of each conducting strip is about 15 to about 20 $\mu$m and the outer conducting strips 12 and 13 are disposed directly along the edge of the window 1. The width and thickness of each conducting strip will be determined by the electrical power requirement of the particular electric consumer. The dimensional characteristics, as well as the material heretofore set out are appropriate to power a motor for a wiper.

A connector 16 is disposed at the end of each conducting strip 12, 13, 14 and 15. The connector will serve to connect the window system and the motor supported by the window to the source of power supplied by the vehicle. In the form of invention illustrated in FIGS. 1-3 a plurality of eight (8) connectors may be used.

Each connector 16 has a base portion which may be soldered or otherwise mounted on a conducting strip (see FIG. 2) and a tongue 17 which extends outwardly of the base. The connectors are mounted at the ends of each conducting strip adjacent the upper and lower edges of the window.

Referring to FIGS. 2 and 3, the source of power of the vehicle, such as a battery (not shown), is represented by cable 19. The power connection to one side of the battery includes a switching relay (not shown). The power connection is completed to one side of the battery by plug 18, carried by cable 19, which is received in a sliding fit on tongue 17. A pair of plugs 18 carried by cables 20 complete the circuit between motor 9 and the conducting strips, while a further cable (not shown), although similar to the cable 19, is connected between the other side of the battery and conducting strip 15. Thus, the electrical path follows from one pole of the battery, through cable 19, conductor 16, conducting strip 14, motor 9 through a pair of cables 20, conducting strip 15, connector 16, and back to the battery through a plug and cable similar to the plug and cable illustrated in FIG. 2. The illustrated receipt of a plug 18 on tongue 17 (FIG. 3) is representative, only.

Referring again to FIG. 3, body 5, surrounding the opening to be closed by window 1 is formed to provide a lip 26. The lip extends into the opening and preferably is disposed in a plane spaced somewhat interiorly of the plane of the body at the opening. A member 25 which generally is U-shaped in profile is received over the lip around the entire opening. The member carries a shoulder 24 or the member is formed integrally with a shoulder adapted to deform somewhat when window 1 is in the closed position. The member and/or shoulder is formed of a deformable material, such as rubber or a rubber substitute. The deformable material serves to provide a seal around window 1. When the window is closed, it will be disposed in the plane of the body and when opened the window will have moved clockwise (according to FIG. 3) about axis 40.

FIG. 4 illustrates a further form of the invention. Referring to the Figure, motor 9 is connected in a circuit including conducting strips 12 and 13 which are disposed as they are in the form of the invention of FIGS. 1–3. Motor 9 is similarly supported by window 30, and the window is similarly mounted to body 5. The electrical connection between the motor 9 and the source of power may be completed in a manner as previously discussed.

In the form of the invention of FIG. 4, a pair of conducting strips 31 and 32 extend along the edges of the window in the same fashion as the conducting strips 14 and 15. The conducting strips 31 and 32, however, do not extend to the region of the center line at the lower edge of window 30 but rather the conducting strips terminate at a position somewhat above the lower edge. A plurality of conductors 33 arranged in a parallel family extend between collecting bars of the conducting strips 31 and 32 and serve as heating conductors. The conductors 33 consist of the same material as the conducting strips 12, 13, 31 and 32 and may be applied to window 30 in the manner as previously discussed.

As may be seen in FIG. 3, the shoulder 24 overlies conducting strips 12 and 13 throughout their entire length. To this end, in the forms of the invention illustrated, the shoulder is substantially of the same width as the conducting strips and because of the particular arrangement of the ends of each conducting strip at the center line, that is, the ends of the conducting strips terminate in a foot portion, the shoulder will not interfere with a connector 16 either during opening or closing of the window. While not shown in FIG. 4, the ends of the conducting strips 12 and 13 adjacent motor 9 may be formed with a foot portion for the same purpose. Also, with some modification of the shoulder, in addition to an increase in width, the shoulder may overlie all of the conducting strips when the window is closed.

It is contemplated, also, to provide a form of electrical coupling for direct connection of the electric consumer and to the connector mounted on the respective conducting strips 12 and 13. In this manner, it is possible to obviate the use of cable 20, as illustrated in FIG. 3.

We claim:

1. A window for use with a vehicle comprised of safety glass and an electric motor carried by said window, means supporting said window on said vehicle for movement about a pivot axis, said pivot axis being located adjacent an edge of said window and said electric motor disposed adjacent another edge of said window, conducting means characterized by current feed lines for the electric motor, said current feed lines formed of conducting strips disposed within the region of the edges of said window and along the edges of said window, said conducting strips comprised of a conductive enamel composition including silver particles, and connector means carried by said conducting strips adapted for connecting said conducting strips both to a power source of said vehicle and said electric motor.

2. The window of claim 1 wherein said pivot axis is located adjacent the upper edge of said window, and said electric motor is disposed adjacent the lower edge of said window, and wherein the conducting means is disposed along the upper and lower as well as the side edges of said window and within the region of the edges of the window.

3. The window of claim 1 wherein a galvanic metal preciptation serves to reinforce said conducting strips.

4. The window of claim 1 wherein the means supporting said window comprises a pair of hinges, each hinge including a pair of arms extending from a pin which defines said pivot axis, one of said arms of each hinge connected to said window and the other arm of each hinge adapted to be connected to said vehicle.

5. The window of claim 1 wherein said window comprises a frameless prestressed glass pane.

6. The window of claim 1 further including means providing a heating resistance including a family of current feed lines, said current feed lines connected to said conducting strips.

7. In combination, a vehicle including a body, means forming an opening on said body, said opening forming means defined by a lip extending into said opening, a window of safety glass for closing said opening, means including a pair of arms extending from a pin supporting said arms at one end about which said arms may pivot, means attaching the other end of one of said arms adjacent an edge of said window and the other end of the other of said arms to said body so that said window may move between a first, opened position and a second, closed position at which said window is supported by said lip, an electric motor carried by said window, said electric motor having a mounting base carried by said window adjacent another edge thereof, conducting means characterized by current feed lines for said electric motor, said current feed lines formed of conducting strips disposed both within the region of the edges of said window and along the edges of said window, said conducting strips comprised of a conductive enamel composition including silver particles, and connector means carried by said conducting strips adapted for connecting said conducting strips both to a power source of said vehicle and said electric motor.

8. The combination of claim 7 wherein said pivot is located adjacent the upper edge of said window, and said electric motor is located adjacent the lower edge of said window.

9. The combination of claim 7 including a member supported by said lip around said opening, said member being formed of a material capable of undergoing deformation when said window is in the second, closed position thereby to seal said opening.

10. The combination of claim 7 wherein said window comprises a frameless, prestressed glass pane.

11. The combination of claim 7 further including means providing a heating resistance including a family of current feed lines, said current feed lines connected to said conducting strips.

* * * * *